(No Model.)
J. F. PLACE.
CENTRAL DRAFT LAMP.
No. 509,324. Patented Nov. 21, 1893.
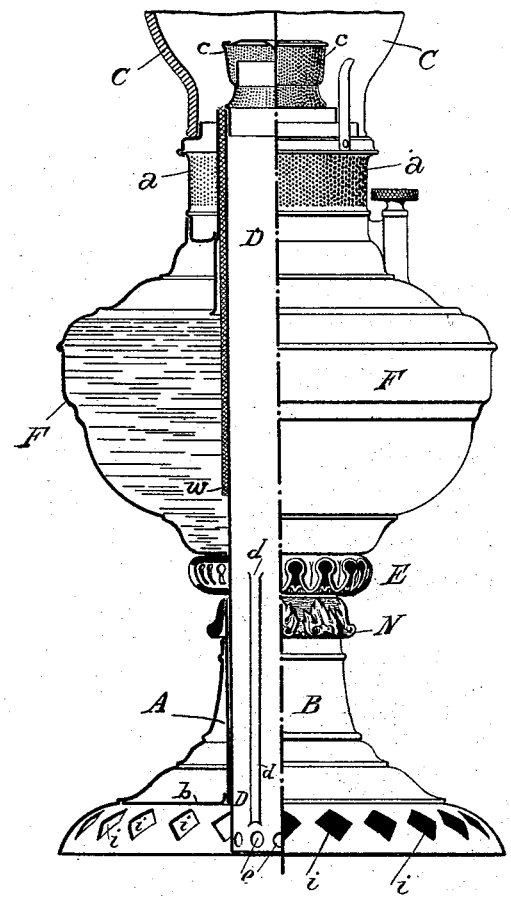
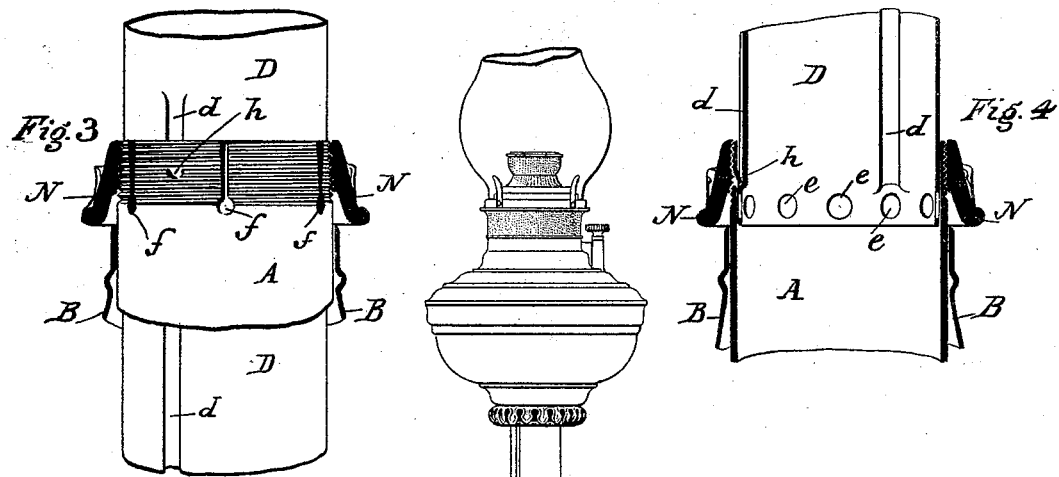
Witnesses:
E. E. Rines
E. M. Hugentobler
Inventor
Jos. Frank Place

UNITED STATES PATENT OFFICE.

JAMES FRANK PLACE, OF MONTCLAIR, NEW JERSEY.

CENTRAL-DRAFT LAMP.

SPECIFICATION forming part of Letters Patent No. 509,324, dated November 21, 1893.

Application filed March 27, 1889. Serial No. 304,993. (No model.)

*To all whom it may concern:*

Be it known that I, JAMES FRANK PLACE, of the city of Montclair, in the county of Essex and State of New Jersey, have invented certain new and useful Improvements in Central-Draft Lamps, of which the following is a complete description, reference being had to the accompanying drawings, forming part of this specification.

The object of my invention is to produce means by which the body of a central draft lamp, may be raised or lowered on its base, and my invention consists in extending the central draft tube below the point to which it is secured and which it is made to support, and causing said central draft tube to telescope into a suitable tube in the base of the lamp. I also provide means for securing the central draft tube (and the lamp which it supports) at any desired height.

In the drawings, Figure 1 is a vertical elevation, half in section of my lamp lowered as far as possible, the fount F resting on the base B. Fig. 2 is a vertical elevation, on a smaller scale, of my lamp raised as far as possible. Fig. 3 is a view of a portion of the central draft tube D and a portion of the surrounding tube A into which the former telescopes, the binding nut N and the top of base B being shown in section, and Fig. 4 is a vertical section of the upper end of tube A and base B, and of nut N, the lower end of central draft tube D being also in section; the tube D in this view is shown raised as high as it will go and the section itself is taken on a vertical radial plane through one of the notches $h$ on tube A.

Similar parts are designated by similar letters of reference.

F is the fount of my central draft lamp; $w$ is the wick. Air is supplied to the latter at the outside through the annular perforated thimble $a$ and at the core through the central draft tube D and the perforated cap or thimble of same $c$.

C is the chimney.

The draft-tube D is secured to the fount F at the bottom thereof and extends below it, so that, when the lamp is at its lowest point, the lower end of the draft tube D is flush with the bottom of the base B.

At the bottom of the fount F, and secured permanently thereto and to the central draft tube D is a strengthening collar or fitting E which is fastened to the tube D at two points so as to steady this tube and prevent it from becoming loose and shifting in the handling of the lamp. This collar E is ornamented or in other ways provided with projections on its outer surface, to furnish means of readily grasping the fount to raise or lower it.

In the base B is a tube A in which the central draft tube D fits snugly and can be moved up and down. The tube A is fastened by soldering, clinching or otherwise to the base A at the top of latter and there is at the bottom a stiffening disk $b$, soldered or clinched or otherwise secured both to the base B and tube D. This is done to insure rigidity. The tube A does not project to the bottom of the base B. The upper end of the tube A is split at several points $f$ and is provided with a taper thread over which fits a suitable binding nut N having a corresponding taper thread. The screwing up of the nut N causes the metal on the end of tube A between the different slits $f$ to be compressed inwardly on the tube D which may therefore be secured in any desired position.

To prevent the lamp being pulled off its base, there are one or more longitudinal depressions on the periphery of the tube D, in that part of it which telescopes in the tube A; but these depressions do not extend quite to the bottom of said tube D. On the upper end of the tube A, there are one or more notches $h$ stamped through the metal and corresponding in position with the depressions $d$ on the central tube D. After the lamp is put together and the tube D has been slid into the tube A, these notches are upset inwardly into the depressions $d$. They allow the tube D to be moved up and down at will but when raised to its limit, the metal at $h$ butts against the bottom of the depressions $d$ and prevents the tube D from being pulled out of the tube A.

The tube D is made to go clear to the bottom of the base B, so as to allow as great a range of motion as possible, and to admit air to it when the lamp is down as in Fig. 1 there are lateral openings or holes $e$ provided in the tube D as well as corresponding ones $i$ in the base B. The supply of air to the draft tube D is therefore through the holes $i$ and $e$ when the lamp is down, while at any other position, the supply of air is through the holes $i$ and the open lower end of the tube D. Instead of holes $e$ and $i$, there may be provided nicks in the lower edges of of the base B and tube D.

Having thus described my invention, what I claim, and desire to secure by Letters Patent, is—

1. In a central draft lamp, the combination of a base having openings for the passage of air, a fount, and a central draft tube extending below the fount and telescoping into the base and provided at its lower end with lateral air openings whereby the said draft tube may receive air when in its lowest position, substantially as specified.

2. In a central draft lamp, the combination with a fount and a base, of a tube secured within the base and having projections, as $h$,—a central draft tube extending below the fount and telescoping in the tube within the base, said central draft tube being provided with grooves, as $d$, in a portion of its length,—the whole being so arranged as to prevent the draft tube from being wholly withdrawn from the base tube,—substantially as set forth.

3. In a central draft lamp, the combination of a base, a tube within said base having slits in its upper end and screw threaded at said upper end, a fount, a central draft tube extending below the fount and telescoping in the tube within the base, the said draft tube being open at its lower end and provided with lateral openings near its lower end whereby said tube may receive air when in either of its extreme positions and a taper nut for holding the central draft tube as adjusted, substantially as specified.

4. In a central draft lamp, the combination of fount F, draft tube D, base B, tube A with slits $f$ and notches $h$, taper nut N, depressions $d$, air openings $e$ and $i$ all as and for the purposes described.

In witness whereof I have hereunto set my hand this 25th day of March, 1889.

JAS. FRANK PLACE.

In presence of—
E. E. RINES,
E. M. HUGENTOBLER.